US011094119B2

(12) United States Patent
Laaksonen et al.

(10) Patent No.: US 11,094,119 B2
(45) Date of Patent: Aug. 17, 2021

(54) VIRTUAL REALITY

(71) Applicant: Nokia Technologies Oy, Espoo (FI)

(72) Inventors: Lasse Laaksonen, Tampere (FI); Miikka Vilermo, Siuro (FI); Arto Lehtiniemi, Lempäälä (FI); Mikko Tammi, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/487,070

(22) PCT Filed: Feb. 20, 2018

(86) PCT No.: PCT/FI2018/050121
§ 371 (c)(1),
(2) Date: Aug. 19, 2019

(87) PCT Pub. No.: WO2018/154179
PCT Pub. Date: Aug. 30, 2018

(65) Prior Publication Data
US 2019/0385369 A1  Dec. 19, 2019

(30) Foreign Application Priority Data
Feb. 23, 2017 (EP) .................... 17157682

(51) Int. Cl.
*G06F 3/01* (2006.01)
*G06T 19/00* (2011.01)
(Continued)

(52) U.S. Cl.
CPC ............ *G06T 19/003* (2013.01); *G06F 3/011* (2013.01); *G06F 3/165* (2013.01); *G09G 5/36* (2013.01);
(Continued)

(58) Field of Classification Search
CPC ........ G06T 19/003; G06F 3/011; G06F 3/165; G09G 5/36; G09G 2354/00; H04S 7/303; H04S 2400/11
See application file for complete search history.

(56) References Cited

U.S. PATENT DOCUMENTS

2014/0345920 A1   11/2014  Terukazu et al.
2015/0042679 A1*  2/2015  Jarvenpaa ............ G06F 3/0304
                                                         345/633
(Continued)

FOREIGN PATENT DOCUMENTS

CN   104183247 A   12/2014
CN   106324838 A   1/2017
(Continued)

OTHER PUBLICATIONS

Extended European Search Report received for corresponding European Patent Application No. 17157682.0, dated Sep. 12, 2017, 8 pages.
(Continued)

*Primary Examiner* — Said Broome
(74) *Attorney, Agent, or Firm* — Alston & Bird LLP

(57) ABSTRACT

A method is provided, comprising: preventing rendering of specific audio in a virtual space to a user through virtual reality; enabling the user to explore the virtual space through user-perspective controlled virtual reality without hearing the specific audio; and in response to an interrupt, performing a visual transition to audio-visual content comprising the specific audio and visual content associated with the specific audio and then rendering specific audio and the visual content associated with the specific audio in the virtual space to the user through virtual reality.

20 Claims, 7 Drawing Sheets

(51) Int. Cl.
*G06F 3/16* (2006.01)
*G09G 5/36* (2006.01)
*H04S 7/00* (2006.01)

(52) U.S. Cl.
CPC ......... *H04S 7/303* (2013.01); *G09G 2354/00* (2013.01); *H04S 2400/11* (2013.01)

(56) References Cited

U.S. PATENT DOCUMENTS

| | | |
|---|---|---|
| 2015/0055808 A1 | 2/2015 | Vennstrom et al. |
| 2015/0302651 A1 | 10/2015 | Shpigelman |
| 2016/0364915 A1 | 12/2016 | Smith et al. |
| 2017/0374486 A1* | 12/2017 | Killham ................ G06F 3/013 |

FOREIGN PATENT DOCUMENTS

| | | |
|---|---|---|
| EP | 3037915 B1 | 8/2017 |
| EP | 3264222 B1 | 4/2019 |
| WO | 2016/191719 A1 | 12/2016 |

OTHER PUBLICATIONS

International Search Report and Written Opinion received for corresponding Patent Cooperation Treaty Application No. PCT/FI2018/050121, dated Jun. 4, 2018, 13 pages.
Office Action for Chinese Application No. 201880026239.2 dated Sep. 21, 2020, 34 pages.
Office Action for European Application No. 17157682.0 dated Apr. 12, 2021, 6 pages.
Office Action for Chinese Application No. 201880026239.2 dated May 8, 2021, 14 pages.

* cited by examiner

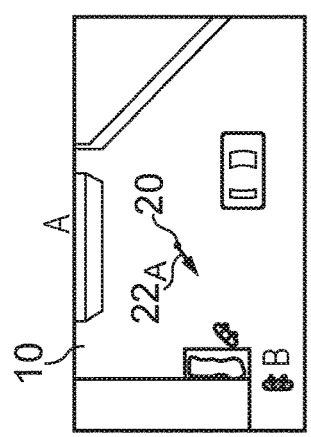
FIG. 14D
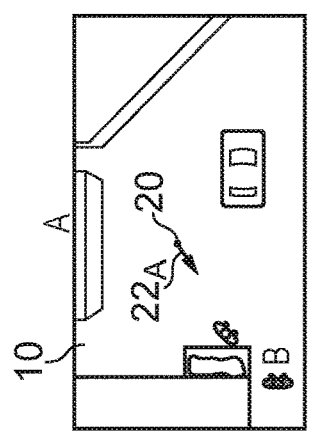
FIG. 14C
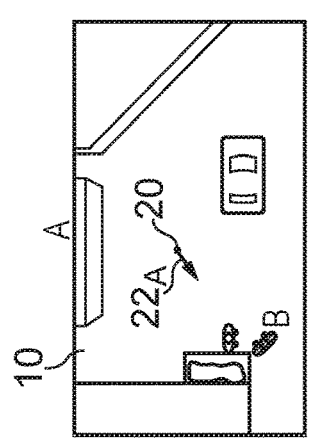
FIG. 14B
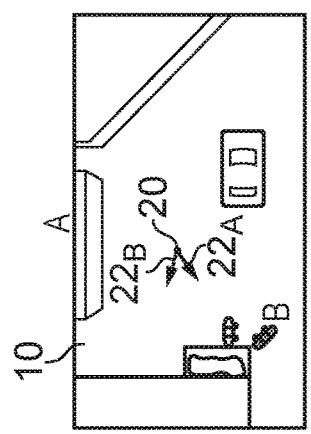
FIG. 14A
FIG. 15D
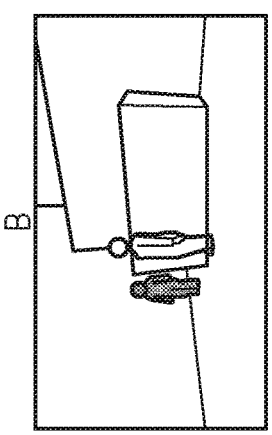
FIG. 15C
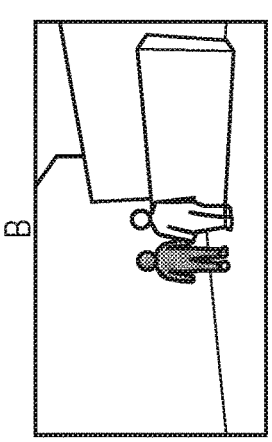
FIG. 15B
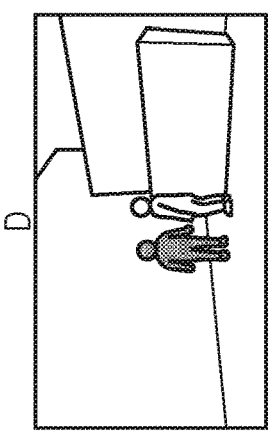
FIG. 15A
FIG. 16D
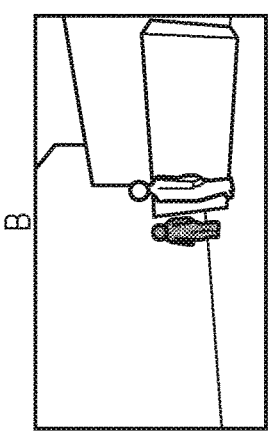
FIG. 16C
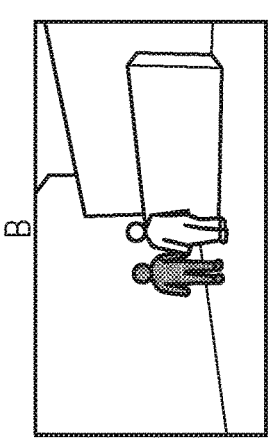
FIG. 16B
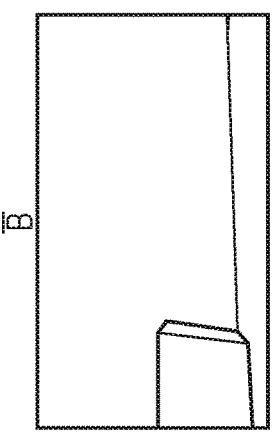
FIG. 16A

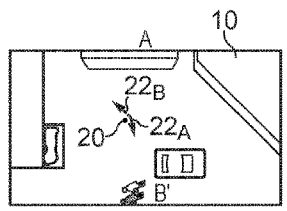 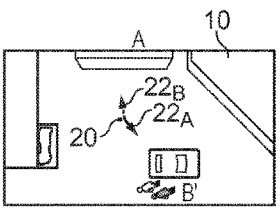 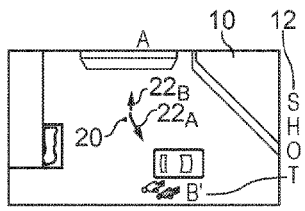 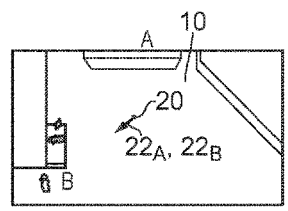
FIG. 14E  FIG. 14F  FIG. 14G  FIG. 14H
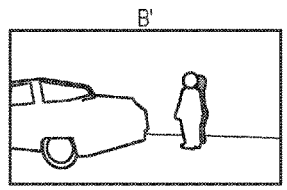 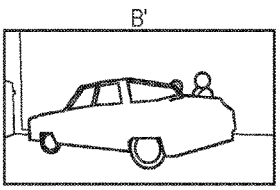 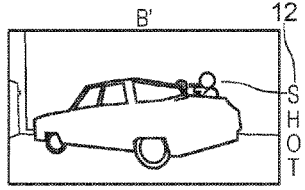 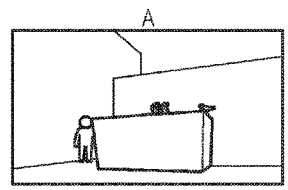
FIG. 15E  FIG. 15F  FIG. 15G  FIG. 15H
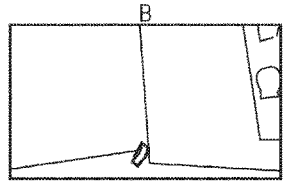 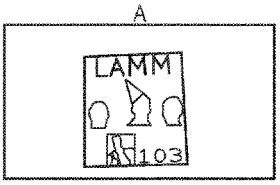 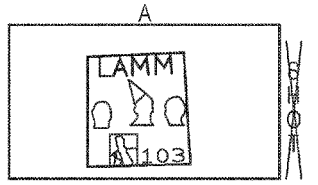
FIG. 16E  FIG. 16F  FIG. 16G

VIRTUAL REALITY

RELATED APPLICATION

This application was originally filed as Patent Cooperation Treaty Application No. PCT/FI2018/050121, filed Feb. 20, 2018 which claims priority benefit to EP Patent Application No. 17157682.0, filed Feb. 23, 2017.

TECHNOLOGICAL FIELD

Embodiments of the present invention relate to virtual reality. In particular, they relate to controlling rendering of content.

BACKGROUND

Virtual reality provides visual content that has a wide field of view, which may be for example up to 360° in the horizontal (azimuth) and up to 180° in the vertical (elevation), and which a user can observe via a narrower observational field of view. The location of the narrower observational field of view within the visual content field of view may be controlled by a user. It may for example track a user's point of view which may be determined by an orientation of a user's head and/or direction of a user's gaze.

Cinema and other content is narrative driven. There are a number of ordered narrative waypoints paced according to narrative time. At each narrative waypoint, at a particular narrative time, a narrative incident occurs. The incident may be visual only, audio-only or audio-visual.

In normal cinema, a user's point of view and user time is synchronised to the narrative point of view and the narrative time determined by the director and in the edit. If normal cinema content were translated to virtual reality content by creating visual content with a wider field of view by, for example, stitching content recorded by different cameras together, then a user's choice of point of view when consuming the content may cause important narrative incidents to be wholly or partly missed. If the user wholly misses the incident the user may be left bewildered. If the user partly misses the incident, the intended impact of the incident may be spoiled.

The problem becomes even greater if a user has freedom to not only control their point of view (orientation) within a virtual space (free point-of view virtual reality) but also control their location within the virtual space (free-viewpoint virtual reality). The likelihood of missing the narrative incident increases.

It would be desirable to provide, in a virtual space, directorial control of a narrative while also giving a user freedom to explore the virtual space by changing their point of view and/or their location within the virtual space.

BRIEF SUMMARY

According to various, but not necessarily all, embodiments of the invention there is provided a method comprising: preventing rendering of specific audio in a virtual space to a user through virtual reality; enabling the user to explore the virtual space through user-perspective controlled virtual reality without hearing the specific audio; and in response to an interrupt, performing a transition to audio-visual content comprising the specific audio and visual content associated with the specific audio and then rendering the audio-visual content comprising the specific audio and the visual content associated with the specific audio in the virtual space to the user through virtual reality.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: causing prevention of rendering of specific audio for rendering in a virtual space to a user through virtual reality; enabling the user to explore the virtual space through user-perspective controlled virtual reality without hearing the specific audio; and in response to an interrupt, causing performing a transition to audio-visual content comprising the specific audio and visual content associated with the specific audio and then causing rendering of the specific audio and the visual content associated with the specific audio in the virtual space to the user through virtual reality.

According to various, but not necessarily all, embodiments of the invention there is provided an apparatus comprising: means for automatically preventing rendering of specific audio for rendering in a virtual space to a user through virtual reality; means for enabling the user to explore the virtual space through user-perspective controlled virtual reality without hearing the specific audio; and means for performing, in response to an interrupt, a transition to audio-visual content comprising the specific audio and visual content associated with the specific audio and then rendering the audio-visual content comprising the specific audio and the visual content associated with the specific audio in the virtual space to the user through virtual reality.

According to various, but not necessarily all, embodiments of the invention there is provided a computer program that when run on a processor enables: automatically preventing rendering of specific audio for rendering in a virtual space to a user through virtual reality; enabling the user to explore the virtual space through user-perspective controlled virtual reality without hearing the specific audio; and in response to an interrupt, performing a transition to audio-visual content comprising the specific audio and visual content associated with the specific audio and then rendering the audio-visual content comprising the specific audio and the visual content associated with the specific audio in the virtual space to the user through virtual reality.

According to various, but not necessarily all, embodiments of the invention there is provided a method comprising: pausing rendering of at least one narrative in a virtual space to a user, through virtual reality, to de-synchronize the at least one narrative and user; enabling the user to explore the virtual space through user-perspective controlled rendering of time-evolving audio-visual content in the virtual space, de-coupled from the narrative; and subsequently unpausing rendering of the narrative in the virtual space to the user, forcing re-synchronization of the narrative and user.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: pausing rendering of at least one narrative in a virtual space to a user, through virtual reality, to de-synchronize the at least one narrative and user; enabling the user to explore the virtual space through user-perspective controlled rendering of time-evolving audio-visual content in the virtual space, de-coupled from the narrative; and subsequently unpausing rendering of the narrative in the virtual space to the user, forcing re-synchronization of the narrative and user.

According to various, but not necessarily all, embodiments of the invention there is provided an apparatus comprising: means for pausing rendering of at least one narrative in a virtual space to a user, through virtual reality, to de-synchronize the at least one narrative and user; means for enabling the user to explore the virtual space through user-perspective controlled rendering of time-evolving audio-visual content in the virtual space, de-coupled from the narrative; and means for subsequently unpausing rendering of the narrative in the virtual space to the user, forcing re-synchronization of the narrative and user.

According to various, but not necessarily all, embodiments of the invention there is provided a computer program that when run on a processor enables: pausing rendering of at least one narrative in a virtual space to a user, through virtual reality, to de-synchronize the at least one narrative and user; enabling the user to explore the virtual space through user-perspective controlled rendering of time-evolving audio-visual content in the virtual space, de-coupled from the narrative; and subsequently unpausing rendering of the narrative in the virtual space to the user, forcing re-synchronization of the narrative and user.

According to various, but not necessarily all, embodiments of the invention there is provided a method comprising: automatically preventing rendering of specific audio for rendering in a virtual space to a user by switching at least one sound object, for the specific audio, from a first un-muted state to a second muted state in dependence upon a user-controlled change of location of the user within the virtual space and/or a user-controlled change of user point of view within the virtual space; and in response to the interrupt, un-muting the specific audio and rendering the specific audio in the virtual space to the user through virtual reality by forcing switching of the at least one sound object from the second un-muted state to the first muted state in dependence upon the interrupt, wherein the sound object is associated with visual content for rendering at a first location in the virtual space to a user. The method may be repeated for multiple sound objects simultaneously.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: preventing rendering of specific audio for rendering in a virtual space to a user by switching at least one sound object, for the specific audio, from a first un-muted state to a second muted state in dependence upon a user-controlled change of location of the user within the virtual space and/or a user-controlled change of user point of view within the virtual space; and in response to the interrupt, un-muting the specific audio and rendering the specific audio in the virtual space to the user through virtual reality by forcing switching of the at least one sound object from the second un-muted state to the first muted state in dependence upon the interrupt, wherein the sound object is associated with visual content for rendering at a first location in the virtual space to a user. The method may be repeated for multiple sound objects simultaneously.

According to various, but not necessarily all, embodiments of the invention there is provided an apparatus comprising: means for preventing rendering of specific audio for rendering in a virtual space to a user by switching at least one sound object, for the specific audio, from a first un-muted state to a second muted state in dependence upon a user-controlled change of location of the user within the virtual space and/or a user-controlled change of user point of view within the virtual space; and means for, in response to the interrupt, un-muting the specific audio and rendering the specific audio in the virtual space to the user through virtual reality by forcing switching of the at least one sound object from the second un-muted state to the first muted state in dependence upon the interrupt, wherein the sound object is associated with visual content for rendering at a first location in the virtual space to a user. The method may be repeated for multiple sound objects simultaneously.

According to various, but not necessarily all, embodiments of the invention there is provided a computer program that when run on a processor enables: preventing rendering of specific audio for rendering in a virtual space to a user by switching at least one sound object, for the specific audio, from a first un-muted state to a second muted state in dependence upon a user-controlled change of location of the user within the virtual space and/or a user-controlled change of user point of view within the virtual space; and in response to the interrupt, un-muting the specific audio and rendering the specific audio in the virtual space to the user through virtual reality by forcing switching of the at least one sound object from the second un-muted state to the first muted state in dependence upon the interrupt, wherein the sound object is associated with visual content for rendering at a first location in the virtual space to a user. The method may be repeated for multiple sound objects simultaneously.

According to various, but not necessarily all, embodiments of the invention there is provided a method comprising: in response to the user performing an action that prevents the user seeing visual content associated with specific audio for rendering in a virtual space to a user through virtual reality, preventing rendering of the specific audio; enabling the user to explore the virtual space through user-perspective controlled virtual reality without hearing the specific audio; and in response to an interrupt rendering audio-visual content for a key-event comprising the specific audio and the visual content associated with the specific audio in the virtual space to the user through virtual reality. The action that prevents the user seeing visual content may be the user turning in the wrong direction. The interrupt may occur when too much time has elapsed. The interrupt may occur when the user is turning towards a location of the key scene.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: in response to the user performing an action that prevents the user seeing visual content associated with specific audio for rendering in a virtual space to a user through virtual reality, preventing rendering of the specific audio; enabling the user to explore the virtual space through user-perspective controlled virtual reality without hearing the specific audio; and in response to an interrupt rendering audio-visual content for a key-event comprising the specific audio and the visual content associated with the specific audio in the virtual space to the user through virtual reality. The action that prevents the user seeing visual content may be the user turning in the wrong direction. The interrupt may occur when too much time has elapsed. The interrupt may occur when the user is turning towards a location of the key scene.

According to various, but not necessarily all, embodiments of the invention there is provided an apparatus comprising: means for, in response to the user performing an action that prevents the user seeing visual content associated with specific audio for rendering in a virtual space to a user through virtual reality, preventing rendering of the specific audio; enabling the user to explore the virtual space through user-perspective controlled virtual reality without hearing the specific audio; and in response to an interrupt rendering audio-visual content for a key-event comprising the specific audio and the visual content associated with the specific audio in the virtual space to the user through virtual reality. The action that prevents the user seeing visual content may be the user turning in the wrong direction. The interrupt may occur when too much time has elapsed. The interrupt may occur when the user is turning towards a location of the key scene.

According to various, but not necessarily all, embodiments of the invention there is provided a computer program that when run on a processor enables: in response to the user performing an action that prevents the user seeing visual content associated with specific audio for rendering in a virtual space to a user through virtual reality, preventing rendering of the specific audio; enabling the user to explore the virtual space through user-perspective controlled virtual reality without hearing the specific audio; and in response to an interrupt rendering audio-visual content for a key-event comprising the specific audio and the visual content associated with the specific audio in the virtual space to the user through virtual reality. The action that prevents the user seeing visual content may be the user turning in the wrong direction. The interrupt may occur when too much time has elapsed. The interrupt may occur when the user is turning towards a location of the key scene.

According to various, but not necessarily all, embodiments of the invention there is provided example embodiments as claimed in the appended claims.

BRIEF DESCRIPTION

For a better understanding of various example embodiments that are useful for understanding the detailed description, reference will now be made by way of example only to the accompanying drawings in which:

FIGS. 4A to 4E illustrate the example of the method with reference to rendered content including audio content and visual content;

Figure 7A:
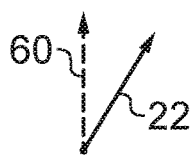
FIG. 7A illustrates an orientation of the user's point of view relative to a reference direction within the virtual space and FIG. 7B illustrates a change in this orientation that occurs after a transition.
Figure 7B:
Figure 7C:
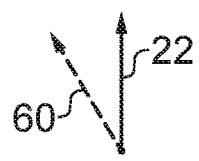
FIG. 7C illustrates an orientation of the reference direction within the virtual space relative to the user's point of view and FIG. 7D illustrates a change in this orientation that occurs after a transition.
Figure 7D:
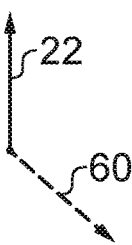
Figure 7E:
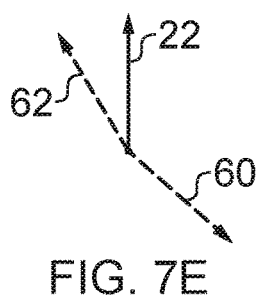
Figure 7F:
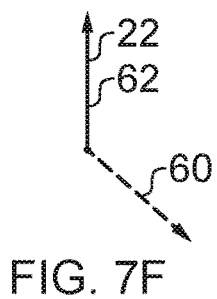
Figure 8A:
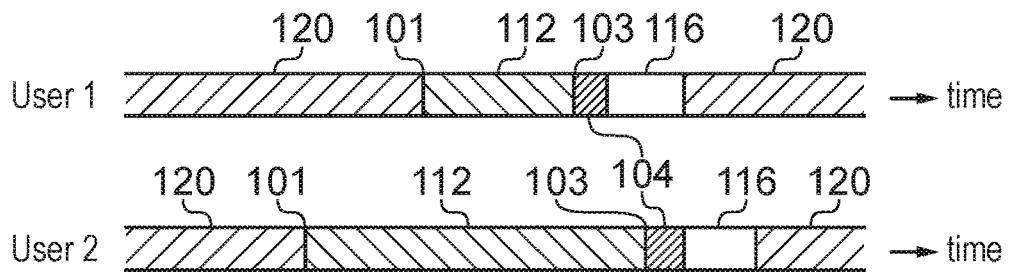
Figure 8B:
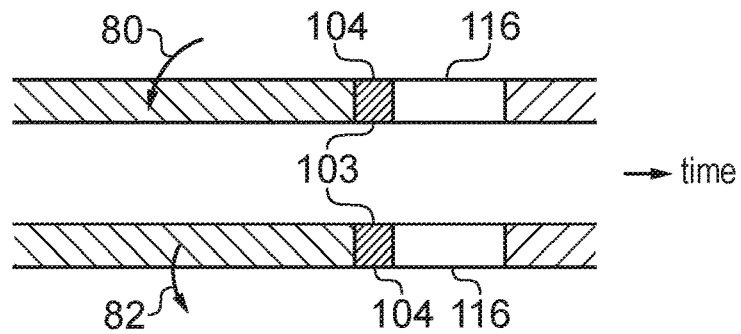
Figure 9:
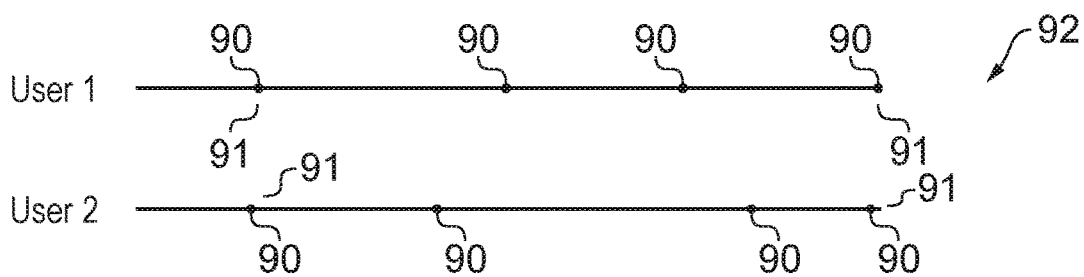
Figure 10:
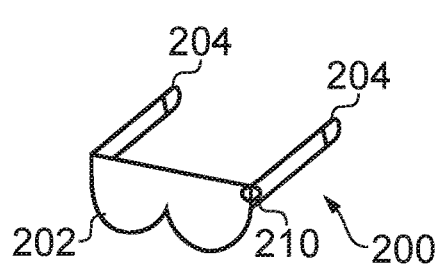
Figure 11:
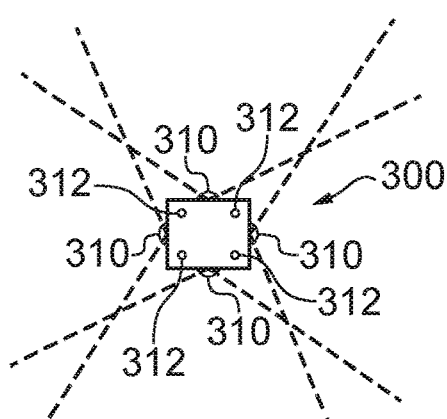
Figure 12:
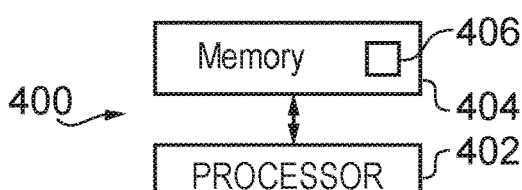
Figure 13:
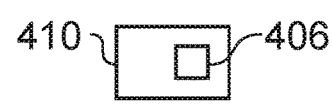
Figure 17:
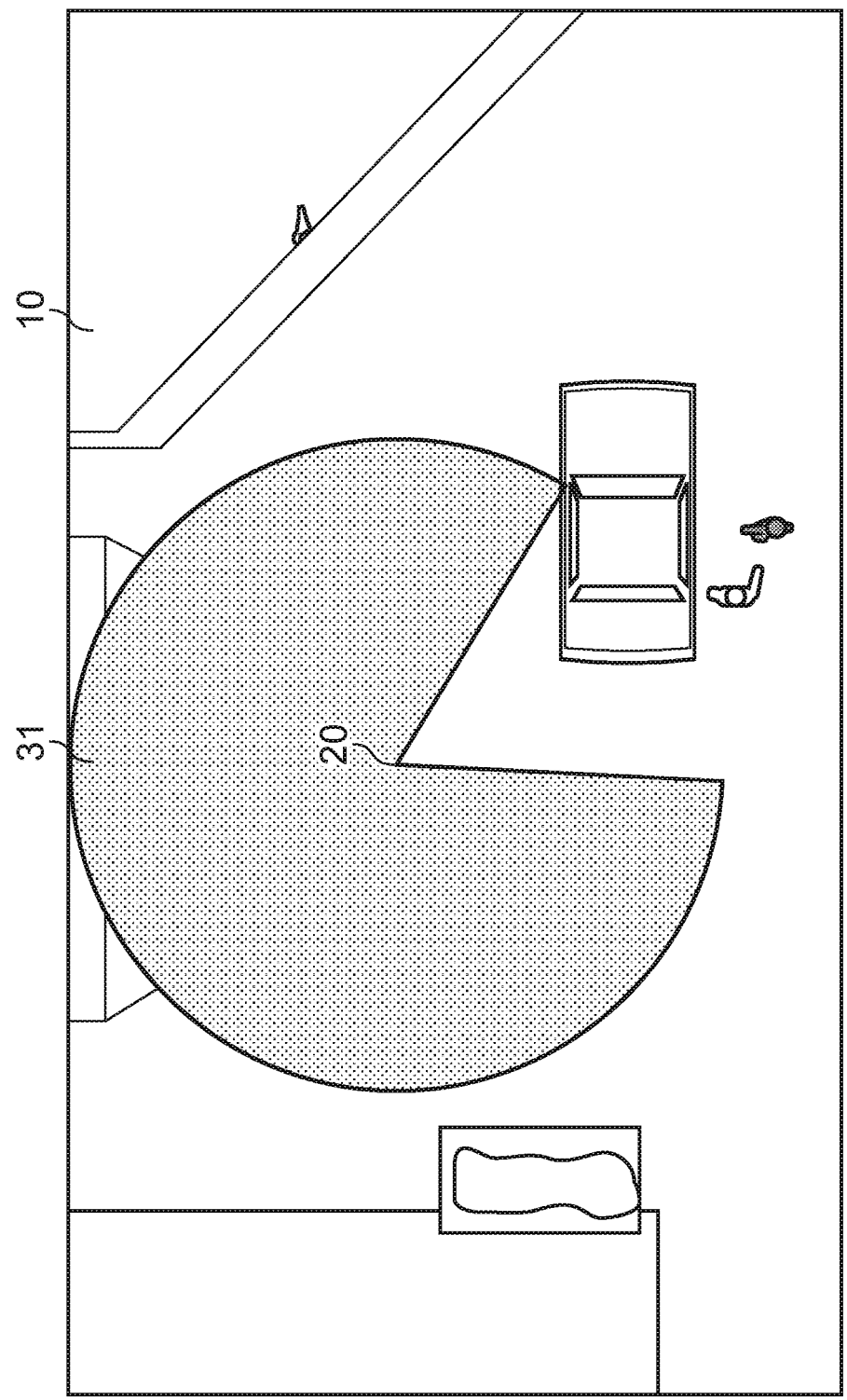

FIG. 7E illustrates an example, before the transition, in which the point of view of the user in real space (aligned with the point of view in virtual space) is misaligned with an orientation direction of the user's body in real space, and FIG. 7F illustrates after the transition the effects of a user-selectable soft reset option that temporarily stops user-perspective controlled virtual reality enabling a change in orientation of the user's head without changing a point of view within the virtual space;

FIG. 8A illustrates example embodiments of different user timelines created by using the method for multiple users;

FIG. 8B illustrates an example of how the timelines may be controlled to achieve synchronization;

FIG. 9 illustrates an example of a narrative that comprises a plurality of narrative way points;

FIG. 10 illustrates an example of an apparatus that may be used for rendering visual content and audio content to a user via virtual reality;

FIG. 11 illustrates an example of a capturing apparatus that may be used to capture a virtual space that may be rendered via audio content and visual content;

FIG. 12 illustrates an example of a controller;

FIG. 13 illustrates an example of a computer program;

FIGS. 14A-H illustrate top-views of the virtual space over time;

FIGS. 15A-H illustrate for each of FIGS. 14A-H, the corresponding visual content rendered to the user according to one point of view of the user; and FIGS. 16A-G illustrate for each of FIGS. 14A-G, the corresponding visual content rendered to the user according to, in some instances, a different point of view of the user; and FIG. 17 illustrates an example of a trigger for an interrupt in the context of FIGS. 14-16.

DETAILED DESCRIPTION

In at least some of the example embodiments described below directorial control over a narrative is provided by interrupting a user when they are exploring the virtual space to render to them content concerning an important narrative incident (a narrative way point). In order to control how this important content is rendered to the user, so that it is rendered in a manner that is controlled by the director, steps are taken to prevent the content being consumed by the user from an incorrect location and/or an incorrect point of view or to prevent the user accidentally being exposed to the content.

In particular, steps may be taken to prevent audio content being consumed by the user when the user is not or cannot consume associated visual content. For example the audio content may be consumed once, at the correct time, when the associated visual content is simultaneously consumed.

For example, according to at least some of the example embodiments below, there is provided a method comprising: preventing rendering of specific audio for rendering in a virtual space to a user, through virtual reality; enabling the user to explore the virtual space through user-perspective controlled virtual reality without hearing the specific audio; and in response to an interrupt, performing a transition to audio-visual content comprising the specific audio and visual content associated with the specific audio and then rendering the audio-visual content comprising the specific audio and the visual content associated with the specific audio in the virtual space to the user through virtual reality.

In this way the rendering of the specific audio and the visual content associated with the specific audio is rendered in a controlled way and, in particular, the specific audio will not accidentally be heard by the user before the user is presented with the associated visual content.

The transition or the visual content and/or the audio content acts as a signal to the user that the interrupt has occurred and helps reduce disorientation of the user. The transition acts as a signal to the user that the interrupt has occurred because it is unexpected. The visual content acts as a signal to the user that the interrupt has occurred because what is seen changes. The aural content acts as a signal to the user that the interrupt has occurred because what is heard changes.

In user-perspective controlled virtual reality, the content that is rendered to the user is dependent upon the perspective of the user (the user's point of view) and a field of view. The perspective (point of view) of the user in a virtual space depends upon a real perspective of the user in real space. The real perspective may be dependent upon an orientation of the user's head in real space or a direction in which a user's eyes gaze in real space. In some but not all examples, the perspective (point of view) of the user in virtual space may additionally depend upon a variable location of the user in the virtual space.

Virtual reality is normally rendered to the user via a head-mounted display and as the user rotates their head, the content rendered to the user via the head-mounted display also changes giving the impression that the user is within the virtual space.

Figure 1:
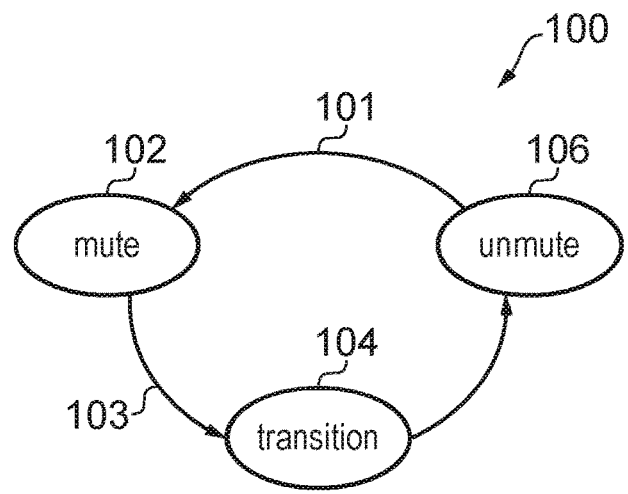
FIG. 1 illustrates an example of a method by means of a simple state diagram.

FIG. 1 illustrates a method by means of a simple state diagram. In this example audio-visual content comprising specific audio content and its associated visual content may initially be in an un-muted state 106. In this state the specific audio content may be rendered and, if the user is in the correct location with the correct point of view, the visual content associated with the specific audio content may also be rendered.

Specific audio is audio that has been specified in some way either explicitly or implicitly. It is used to connote limitation to a sub-set of possible audio in contradistinction to all possible audio. Thus preventing rendering of specific audio is preventing rendering of a sub-set of audio that could be prevented from being rendered.

However, at other points of view and/or other locations, the specific audio content may be rendered while rendering different visual content.

Audio may be rendered and perceived regardless of the orientation of a user whereas visual content may be strictly controlled in accordance with the user viewing orientation. For example, the visual content may be dependent upon a user point of view and a field of view, thus changing orientation changes the point of view and the visual content within the field of view. Audio may include specific audio and non-specific audio. When specific audio is muted, the non-specific audio may remain un-muted.

A muting interrupt 101 may cause a transition from the un-muted state to the mute state 102. This transition may occur automatically, for example, if certain conditions are met.

An automatic transition may be a fully automatic transition that occurs, without any further user interaction, once the certain conditions are met. Alternatively, an automatic transition may be a semi-automatic transition that occurs, after user confirmation, once the certain conditions are met.

The conditions may, for example, determine that the user has performed an action that prevents the user seeing a source of the specific audio, or a key event related to the specific audio, when a key event occurs. The muting interrupt 101 may thus be an automatic response to the user turning in the wrong direction (i.e., too far) relative to a time instance of the audio-visual content and the key scene. The conditions may be user programmable.

In the mute state 102, the specific audio is muted so that it is no longer rendered in the virtual space to the user. The specific audio is automatically prevented from being rendered in the virtual space to the user. While the specific audio is in the mute state 102, the user is able to explore the virtual space through user-perspective controlled virtual reality without hearing the muted specific audio but while still hearing un-muted non-specific audio.

Subsequently, an un-muting interrupt 103 may cause a transition from the mute state 102 to the un-muted state 106 automatically via an intermediate and temporary transition state 104. The un-muting interrupt 103 may occur, for example, when certain conditions are met.

On entering the un-mute state 106, the specific audio is un-muted and visual content associated with the specific audio is rendered in the virtual space to the user through virtual reality. The audio-visual content comprising the specific audio and the visual content associated with the specific audio is rendered in the virtual space to the user through virtual reality.

In some example embodiments, the un-muting of the specific audio may occur before a visual transition and before rendering the visual content associated with the specific audio. In some example embodiments, the un-muting of the specific audio may occur simultaneously with a visual transition. In some example embodiments, the un-muting of the audio may occur after a visual transition and before a start of rendering the visual content associated with the specific audio. In some example embodiments, the un-muting of the audio may occur after a visual transition and simultaneously with a start of rendering of the visual content associated with the specific audio. In some example embodiments, the un-muting of the audio may occur after a visual transition and after a start of rendering of the visual content associated with the specific audio. In some of these example, but not necessarily all of these example embodiments, the transition may coincide with a start of rendering the audio-visual content comprising the specific audio and the visual content associated with the specific audio content. In other example embodiments, there may be a gap between the transition and a start of rendering the audio-visual content comprising the specific audio and the visual content associated with the specific audio.

Figure 2:
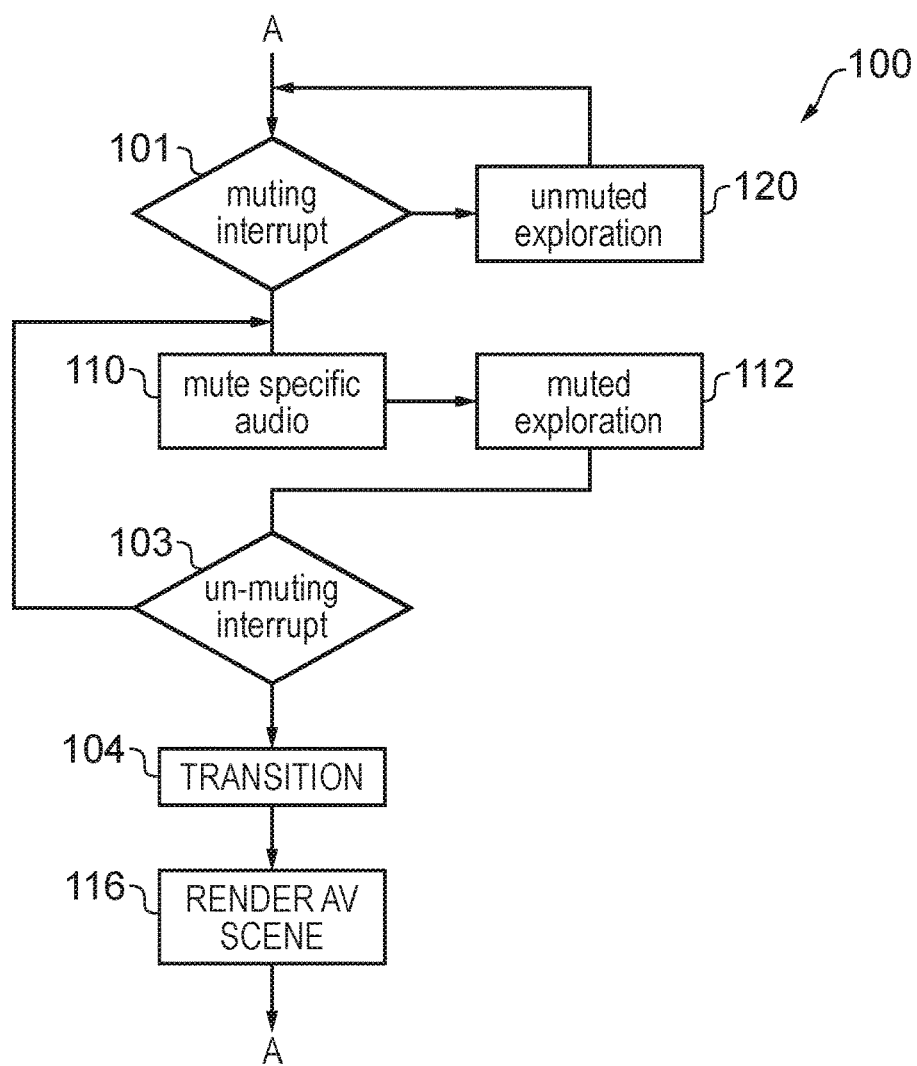
FIG. 2 illustrates an example of the method in the form of a flow diagram.

FIG. 2 illustrates an example of a method 100 in the form of a flow diagram. This flow diagram illustrates the method 100 from a control perspective and in relation to the experience perceived by the user.

Initially the user is in an un-muted exploration state 120. The user is able to explore the virtual space through user-perspective controlled virtual reality while hearing the specific audio (and possibly other audio). This continues until the muting interrupt 101 is detected. When the muting interrupt 101 is detected the method moves to block 110.

At block 110, the method 100 automatically prevents rendering of the specific audio in the virtual space to the user, through virtual reality. The other audio may continue to be rendered. The method proceeds to block 112, the muted exploration state, in which the user is able to explore, at least partially, the virtual space through user-perspective controlled virtual reality without hearing the specific audio. This state continues until the un-muting interrupt 103 occurs.

When the un-muting interrupt 103 occurs, a transition to audio-visual content comprising the specific audio and visual content associated with the specific audio is performed at block 104. As described above, the timing relationship of the un-muting of the specific audio and the visual transition to visual content associated with the specific audio may vary. At block 116, an audio-visual scene is rendered. This comprises rendering at least the audio-visual content comprising the specific audio and the visual content associated with the specific audio in the virtual space to the user through virtual reality.

While this method 100 has been described in relation to one example of specific audio, associated with particular visual content, it will be appreciated that there may be multiple pairings of different specific audio and their associated visual content. The method 100 may therefore repeat at different times and at different locations within the virtual space using different specific audio.

The method 100 enables an un-muted exploration state 120 and a muted exploration state 112. It also enables a forced transition from the muted exploration state 112 so that a key audio-visual scene is rendered to the user at block 116 without user command. This forced rendering 116 of the key audio-visual scene to the user enables directorial control of the consumption of audio-visual content. 'Forced' in this context means that it happens at the command of the method and not the user. A director is able to control how and at least partly when the key audio-visual scene is rendered to the user. In this way, the director can control pacing of a narrative and how it is rendered to a user. The method 100 also prevents inadvertent exposure of the user to aspects of the key audio-visual scene by providing the muted exploration state 112.

The muting interrupt 101 that causes automatic preventing rendering of the specific audio for rendering in the virtual space to the user through virtual reality, may be, in some but not necessarily all example embodiments, a user-generated interrupt. It may, for example, be automatically generated in dependence upon a change in a point of view of the user in the virtual space and/or a change in a location of the user in the virtual space. For example, muting may occur automatically when the user is not paying attention (does not have the expected point of view) and there is therefore a likelihood that an important audio-visual scene will be missed or will only be partially appreciated. Actions of the user may for example flag that the user is not paying attention. These may for example include a wandering gaze, restlessness, movement away from the expected location and changing a point of view away from the expected point of view. The muting interrupt 101 may be automatically generated in dependence upon one or more different conditions, which may be programmable.

In some example embodiments, the muting interrupt 101 is an automatic response to the user performing an action (e.g. turning in the wrong direction) that prevents the user seeing a source of the specific audio, or a key event related to the specific audio, when a key event occurs.

In some example embodiments, the muting interrupt 101 is an automatic response to the user turning in the wrong direction (i.e., too far) relative to a time instance of the audio-visual content and the key scene. The un-muting interrupt 103 happens when too much time has elapsed or when the user is turning towards the direction of the key scene.

The un-muting interrupt 103 may, in some but not necessarily all example embodiments, be an interrupt that is dependent upon a user location within the virtual space and/or a user point of view within the virtual space and/or time elapsed within the virtual space.

For example, if the user wanders in the virtual space too far from a desired location and/or from a desired point of view then the un-muting interrupt 103 may occur. Also, if the user has wandered from the desired location and/or desired point of view for too long a period of time, the un-muting interrupt 103 may occur. Also, if the user has wandered from the desired location and then returns to it and/or has wandered from the desired point of view and then returns to it, the un-muting interrupt 103 may occur. The un-muting interrupt 103 may be dependent upon one or more different conditions, which may be programmable.

It will therefore be appreciated that the transitions to the muted exploration state 112 and from the muted exploration state 112 may be variably controlled.

While the conditions for generating an interrupt 101, 103 will generally be dependent upon a location in virtual space of the user and/or a point of view of the user and/or time elapsed, in other example embodiments they may be dependent upon other contextual conditions such as for example actions performed by the user within the virtual space or, for example, actions performed by other users within the virtual space. It is therefore possible for an interrupt 101, 103 to be dependent upon user interaction with a virtual object, for example a door, within the virtual space or for an interrupt 101, 103 to be dependent upon another user's interaction with a virtual object, for example a door, within the virtual space.

Figure 3A:
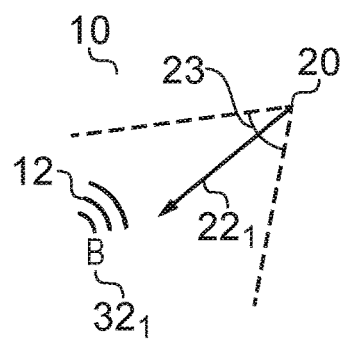
FIGS. 3A, 3B and 3C illustrate an example of the method with reference to a virtual space.
Figure 3B:
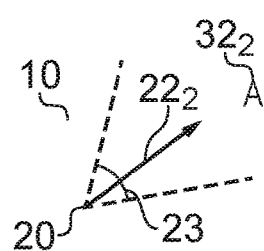
Figure 3C:
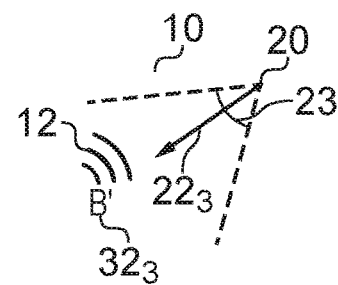
Figure 5A:
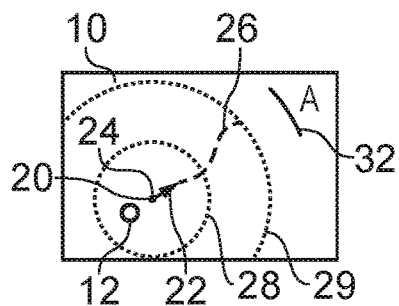
FIGS. 5A, 5B and 5C illustrate another example of the method with reference to a virtual space.
Figure 5B:
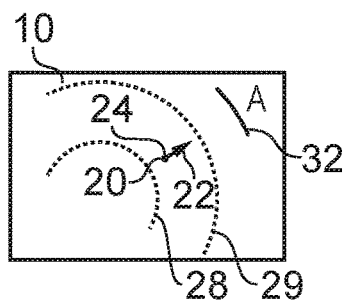
Figure 5C:
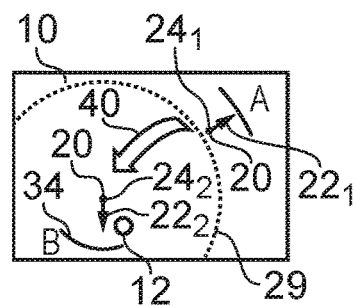

FIGS. 3A, 3B and 3C illustrate one example embodiment of the above-described method 100 with reference to a virtual space 10. FIGS. 5A, 5B and 5C illustrate another example of the above-described method 100 with reference to a virtual space 10.

In these example embodiments, the virtual space 10 is illustrated as a two-dimensional space from above. However, the virtual space 10 is typically a three-dimensional space.

In these Figs, a user 20 has a location 24 within the virtual space 10 and has a point of view 22 within the virtual space 10. The content rendered to the user 20 in the virtual space 10 through virtual reality depends upon the location 24 of the user, the point of view 22 of the user and the current time within the virtual space 10, assuming that the virtual space varies with time as is most common.

In user-perspective controlled virtual reality, the content that is rendered to the user is dependent upon the perspective of the user (the user's point of view 22). This virtual reality is normally rendered to the user via a head-mounted display and as the user rotates their head, the content rendered to the user via the head-mounted display also changes giving the impression that the user 20 is within the virtual space 10.

In some example embodiments, the location 24 of the user 20 may be fixed and immovable. However, in other example embodiments the location 24 of the user 20 may be variable. The location 24 may, for example, be continuously variable or the location may be discretely variable (the user jumps between pre-defined locations).

When moving large distances, or for example in closed spaces, within the virtual space, a sound source may become audible or inaudible due to other contextual reasons independent of the muting interrupt 101. The specific audio is muted in response to the muting interrupt 101 regardless of this contextual variation in audio content rendering volume and the muting thus overrides any acoustics-based or spatial rendering engine specific variations of sound content over time.

In some example embodiments, the muting interrupt 101 is an automatic response to the user performing an action (e.g. turning too far in the wrong direction relative to a time instance of the audio-visual content and the key scene) that prevents the user seeing a source of the specific audio when a key event occurs. The un-muting interrupt 103 happens when a time elapse since the interrupt 101 exceeds a threshold or when the user is turning their point of view towards the location of the key scene.

FIG. 3A corresponds to the un-muted exploration state 120 illustrated in FIG. 2. Specific audio 12 is rendered to the user 20 in the virtual space 10 through virtual reality.

The user 20 is able to explore at least partially the virtual space 10 through user-perspective controlled virtual reality while still hearing the specific audio 12.

The point of view $22_1$ defines visual content $32_1$ within the virtual space 10 that is rendered to a user through user-perspective controlled virtual reality. The visual content $32_1$ is determined by a field of view 23 centered on the point of view $22_1$.

In this example, the visual content $32_1$ comprises a visual object B which is associated with the specific audio 12.

The audio-visual content comprising the specific audio 12 and the visual content $32_1$ defined by the point of view $22_1$ are rendered in the virtual space to the user through virtual reality.

In the example of FIG. 3A, the user 20 is changing the point of view 22. Before the change, the user 20 can hear un-muted the specific audio 12. After the change, the point of view 22 of the user and field of view 23 defines visual content 32 that does not comprise the object B associated with the specific audio 12. This change in the point of view 22 causes the muting interrupt 101. The muting interrupt 101 results in automatic muting of the specific audio 12 that was previously rendered in the virtual space to the user through virtual reality.

The user 20 is now in the muted exploration state 112 illustrated in FIG. 2. This is also illustrated in FIG. 3B. The user is able to explore at least partially the virtual space 10 through user-perspective controlled virtual reality by changing the point of view 22 without hearing the specific audio 12. In the example of FIG. 3B, the user 20 has a point of view $22_2$ towards an object A in the virtual space 10. The point of view $22_2$ within the virtual space 10 and the field of view 23 defines visual content $32_2$ within the virtual space 10 that comprises the object A.

FIG. 3C illustrates the consequences of the un-muting interrupt 103. As a consequence of the un-muting interrupt 103, the effective point of view 22 of the user changes from point of view $22_2$ to the point of view $22_3$ in the virtual space 10. This new effective point of view $22_3$ in combination with the field of view 23, defines visual content $32_3$ within the virtual space 10 that comprises the object associated with the specific audio 12. The un-muting interrupt 103 provides an effective teleport changing the orientation of the user 20 within the virtual space 10.

The un-muting interrupt 103 causes a transition to audio visual content comprising the specific audio 12 and the visual content $32_3$ associated with specific audio 12 and then causes rendering of the audio-visual content comprising the specific audio 12 and the visual content $32_3$ associated with the specific audio 12 in the virtual space 10 to the user through virtual reality.

In some example embodiments, the visual content $32_1$ and visual content $32_3$ may be defined by the same point of view and field of view.

In other example embodiments, the visual content $32_1$ and visual content $32_3$ may be defined by different points of view $22_1$, $22_3$ and the same field of view. The point of views are however sufficiently similar for the object B associated with specific audio 12 to be included in the visual content $32_3$, although it may be in a different position or state B' at the later time of the un-muting interrupt 103.

FIGS. 4A to 4E illustrate audio-visual content rendered to the user including audio content and visual content. These Figs will be explained with reference to features of FIGS. 3A, 3B and 3C already described.

Figure 4A:
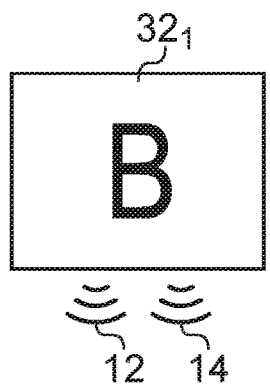

FIG. 4A illustrates the rendering of audio visual content comprising the visual content $32_1$ and the specific audio content 12. In this example, the rendered visual content corresponds to a scene comprising the object B associated with the specific audio 12. The rendered audio content includes the specific audio 12 and also other audio 14.

Figure 4B:
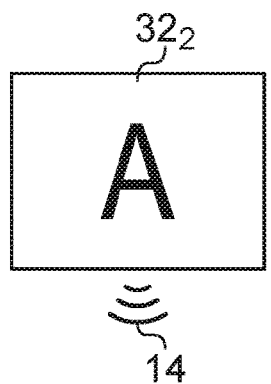

FIG. 4B illustrates the rendering of audio visual content comprising the visual content $32_2$ and the audio content 14. In this example, the rendered visual content corresponds to a scene comprising object A. The rendered audio content includes the other audio 14 but does not include the specific audio 12 which has been muted.

Figure 4C:
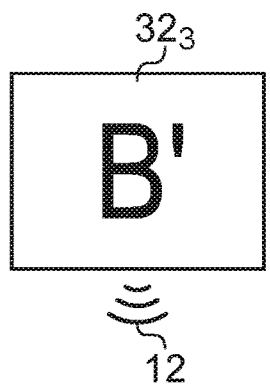

FIG. 4C illustrates performing, in response to the un-muting interrupt 103, a transition to audio visual content comprising the specific audio content 12 and the visual content 32 associated with the specific audio content 12 and then rendering the audio-visual content comprising the specific audio 12 and the visual content 32 associated with the specific audio 12 in the virtual space to the user through virtual reality.

This results in rendering of the key audio-visual scene (block 116 in FIG. 2). The specific audio 12 has been un-muted, the visual transition 50 has been performed and there is rendering of the audiovisual content comprising the specific audio content 12 and the visual content $32_3$ associated with the specific audio content 12 in the virtual space 10 to the user 20 through virtual reality.

The user 20 has been teleported from the point of view $22_2$ to the point of view $22_3$ such that it appears to the user that the user has been physically rotated in the virtual space 10 and also possibly transported through narrative time. The muting interrupt 101 causes de-synchronization of at least one narrative and the user, enabling the user to explore at least partially the virtual space through user-perspective controlled rendering of time-evolving audio-visual content in the virtual space, de-coupled from the narrative. The un-muting interrupt 103 subsequently un-pauses rendering of the narrative in the virtual space to the user, forcing re-synchronization of the narrative and user.

In this example, the rendered visual content $32_3$ corresponds to a scene comprising the object B' associated with the specific audio 12 at this time. The rendered audio content includes the specific audio 12 and may, optionally also include, other audio. The specific audio 12 may appear to come from the object B' associated with the specific audio 12 at this time.

It will therefore be appreciated that the visual content 32 rendered before the transition 50 is dependent upon at least a user-determined point of view $22_2$ before transition 50 and the visual content 32 associated with the specific audio 12 rendered after transition is not.

The un-muting interrupt 103 in effect forces an apparent user point of view to coincide with the user point of view $22_3$ associated with the key event which is associated with the specific audio 12.

In this example, the muting interrupt 101 is an automatic response to the user performing an action (e.g. turning in the wrong direction) that prevents the user seeing a source B of the specific audio 12 when a key event occurs. The muting interrupt 101 is thus an automatic response to the user turning in the wrong direction (i.e., too far) relative to a time instance of the audio-visual content and the key scene The un-muting interrupt 103 happens when too much time has then elapsed or when the user is turning towards the direction of the key scene.

The muting interrupt 101 causes de-synchronization of at least one narrative and the user, enabling the user to explore at least partially the virtual space through user-perspective controlled rendering of time-evolving audio-visual content in the virtual space, de-coupled from the narrative. The un-muting interrupt 103 subsequently un-pauses rendering of the narrative in the virtual space to the user, forcing re-synchronization of the narrative and user.

FIG. 5A corresponds to the un-muted exploration state 120 illustrated in FIG. 2. Specific audio 12 is rendered to the user 20 in the virtual space 10 through virtual reality. The user 20 is able to explore the virtual space 10 through user-perspective controlled virtual reality while still hearing the specific audio 12.

In the example of FIG. 5A, the user 20 is moving 26 to a new location 24 and a new point of view 22. During this movement, the user 20 satisfies a user-dependent muting condition 28 dependent upon the location 24 and/or field of view 22 of the user 20. The user-dependent muting condition 28 may be dependent upon a location $24_2$ that is associated with the visual content 34 and its associated specific audio 12. In FIG. 5A, the user location $24_1$ is outside a location limit defined by user-dependent muting condition 28 triggering the muting interrupt 101. This results in automatic muting of the specific audio 12 that was previously rendered in the virtual space to the user through virtual reality.

The user 20 is now in the muted exploration state 112 illustrated in FIG. 2. This is also illustrated in FIG. 5B. The user is able to explore the virtual space 10 through user-perspective controlled virtual reality without hearing the specific audio 12. In the example of FIG. 5B, the user 20 is at a location 24 and has a user point of view 22 towards an object A in the virtual space 10. The location 24 and the point of view 22 within the virtual space 10 define rendered virtual content 32 that includes the object A.

FIG. 5C illustrates the consequences of the un-muting interrupt 103. As a consequence of the un-muting interrupt 103 the effective position of the user 20 changes from location $24_1$ to location $24_2$ in the virtual space 10 and the effective point of view 22 of the user changes from point of view $22_1$ to the point of view $22_2$ in the virtual space 10. These effective locations and points of view $22_2$, $24_2$ define visual content 32 within the virtual space 10 that comprises an object B, in this example. The un-muting interrupt 103 therefore provides an effective teleport 40 changing the location and orientation of the user within the virtual space 10. The un-muting interrupt 103 causes a transition to audio visual content comprising the specific audio 12 and the visual content 32 associated with specific audio 12 and then rendering the audio-visual content comprising the specific audio 12 and the visual content 32 associated with the specific audio 12 in the virtual space 10 to the user through virtual reality.

FIGS. 6A to 6E illustrate content rendered to the user including audio content and visual content. These Figs will be explained with reference to features of FIGS. 5A, 5B and 5C already described.

Figure 6A:
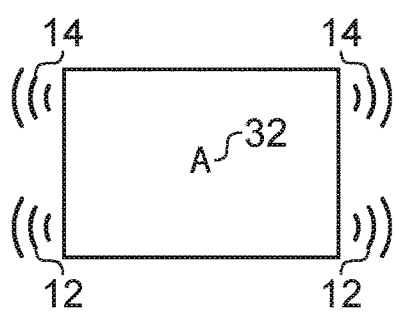
FIGS. 6A to 6E illustrate the another example of the method with reference to rendered content including audio content and visual content.

FIG. 6A illustrates the visual content 32 and audio content 12, 14 rendered to the user as the user moves 26 towards the object A in the virtual space 10 but is within the first zone 28. In this example, the rendered visual content corresponds to a scene comprising object A, at a distance. The rendered audio content includes the specific audio 12 and also other audio 14.

Figure 6B:
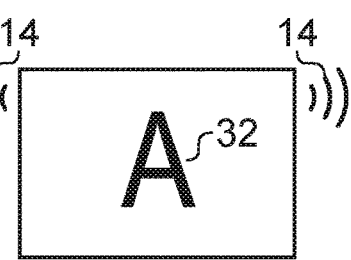

FIG. 6B illustrates the content rendered to the user 20 when the user leaves the first zone 28 and approaches more closely the object A. In this example, the visual content 32 is the visual scene comprising A, up close. The specific audio 12 has been automatically muted in response to the muting interrupt 102 when the user 20 left the first zone 28. However, in this example, the audio content still comprises the other audio 14.

Figure 6C:
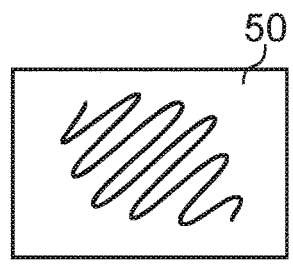

FIG. 6C illustrates the visual transition 50 that occurs in response to the un-muting interrupt 103. This figure corresponds to the virtual teleportation 40 illustrated in FIG. 5C.

Figure 6D:
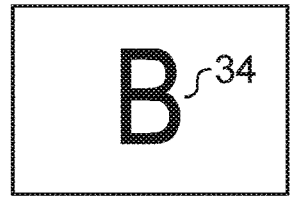
Figure 6E:
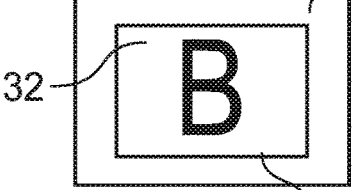

FIGS. 6D and 6E illustrate different renderings of the key audio-visual scene (block 116 in FIG. 2). The specific audio 12 has been un-muted, the visual transition 50 has been performed and there is rendering of the specific audio 12 and the visual content 32 associated with the specific audio 12 in the virtual space 10 to the user 20 through virtual reality.

In the example of FIG. 6D, the user 20 has in fact been teleported from the location $24_1$ with point of view $22_1$ to the location $24_2$ with point of view $22_2$ such that it appears to the user that the user has been physically transported through the virtual space 10 and also possibly through time.

In FIG. 6E, the key audio-visual scene is presented without changing the location $24_1$ or point of view $22_1$ of the user in the virtual space 10. Instead a frame 60 is provided in the existing rendered content 34 and the visual content 32 associated with the specific audio 12 is rendered within the frame 60. Any audio content associated with the rendered content 34 is muted and the audio content 12 is un-muted. The experience that the user 20 has is therefore that time has stopped temporarily at the current location and a window has been provided to the audio-visual scene. The audio-visual scene is rendered, within the frame 60, as if the user is at the location $24_2$ with point of view $22_2$ in the virtual space 10.

It will therefore be appreciated that the visual content 32 rendered before the visual transition 50 is dependent upon at least a user-determined point of view $22_2$ before transition 50 and the visual content 32 associated with the specific audio 12 rendered after transition is not.

The un-muting interrupt 103 in effect forces an apparent user location to coincide with a user location $24_2$ associated with the specific audio 12 and/or forces an apparent user point of view to coincide with the user point of view $22_2$ associated with the specific audio 12.

The muting interrupt 101 causes de-synchronization of at least one narrative and user, enabling the user to explore the virtual space through user-perspective controlled rendering of time-evolving audio-visual content in the virtual space, de-coupled from the narrative. The un-muting interrupt subsequently un-pauses rendering of the narrative in the virtual space to the user, forcing re-synchronization of the narrative and user.

The transition caused by the muting interrupt 101 may be reversible if the user 20 returns within the first zone 28 or returns within the first zone 28 within a predetermined time.

It will be appreciated from the foregoing description that the muting interrupt 101 may, in some but not necessarily all example embodiments, depend upon a user location 24 and/or point of view 22 within the virtual space 10. However, other conditions are possible for activating the muting interrupt 101 and/or the un-muting interrupt 103.

For example, in some but not necessarily all example embodiments, the un-muting interrupt 103 may be activated when whichever of a number of different conditions is satisfied first. One such condition may be for example dependent upon a location 24 and/or field of view 22 of the user 20 within the virtual space 10. Another condition may be related to the time that has elapsed within the virtual space 10 or elapsed while in the muted exploration state 112.

For example, a user-dependent un-muting condition 29 dependent upon the location 24 and/or field of view 22 of the user 20 may be defined, as illustrated in FIG. 5A. The user-dependent un-muting condition 29 may be dependent upon a location $24_2$ that is associated with the visual content 34 and its associated specific audio 12. In FIG. 5C, the user location $24_1$ is outside a location limit defined by user-dependent condition 29 triggering the un-muting interrupt 103

For example, if it becomes unlikely that a user will serendipitously return to the correct location $24_2$ and point of view $22_2$ for rendering the specific audio 12 and its associated visual content 34, then the un-muting interrupt 103 and transition 50 may occur. In some example embodiments, the user-dependent un-muting condition 29 may vary with time, for example, to reflect the likelihood that a user will return or travel to the preferred location $24_2$ for rendering the key audio-visual scene (block 116, FIG. 2).

The time limit used may for example be set to try and control a pace of a narrative. For example, the narrative may comprise a number of key audio-visual scenes and it may be necessary for these to occur within a certain time of each other. In other instances, a user may wish to be able to control this time limit to, for example, limit the period of time that they spend within the virtual space 10.

In other example embodiments, the un-muting interrupt 103 may depend upon satisfaction of one or more conditions that vary in dependence upon a context determined by interaction of the user 20 and the virtual space 10. For example, it may be possible to introduce sub-narrative plots and provide extra time and/or extra space in which to explore these sub-narrative plots. However, the discovery of these sub-narrative plots may require the user 20 to perform certain specific actions within the virtual space 10 including for example interacting with virtual objects and/or travelling to a specific location 24 and/or having a specific point of view 22.

The specific audio 12 may be a sound object that can be located at a fixed or variable specific position within the virtual space 10. In the example embodiments illustrated in FIGS. 3A to 3D and 4A to 4F and FIGS. 5A to 5D and 6A to 6F, the sound object has a first un-muted state and a second muted state.

The first un-muted state causes rendering of the sound object 12 to the user. This rendering may in some example embodiments be independent of whether or not the associated visual content is rendered. This broadly corresponds to the situation illustrated in FIG. 6A where it is possible to hear the specific audio of the sound object 12 without being able to view the visual content 32 associated with that sound object 12.

The sound object 12 also has a second muted state. This corresponds to the situation illustrated in FIGS. 4B and 6B, 6C.

The first un-muted state, when first entered from the second muted state, causes rendering of the sound object 12 to the user only when the associated visual content 32 is rendered. This corresponds to the situation illustrated in FIGS. 4C, 6D and 6E.

In this situation, the method 100 comprises automatically preventing rendering of specific audio for rendering in the virtual space 10 to the user 20 by switching the sound object 12 from the first un-muted state to the second muted state in dependence upon a user-controlled change of location 24 of the user 20 within the virtual space 10 and/or a user-controlled change of point of view 22 of the user 20 within the virtual space 10. The method 100 also comprises in response to an un-muting interrupt 103, un-muting the specific audio and rendering the specific audio in the virtual space 10 to the user 20 through virtual reality by forcing switching of the sound object 12 from the second muted state to the first un-muted state in dependence upon the interrupt 103.

Referring back to FIGS. 4A to 4C and 6A to 6E, the other sound 14 illustrated as rendered in FIGS. 4A, 6A, 6B may for example be ambient sound rendered independently of location, possibly at a location-dependent volume and selective sound that is rendered only when the user is at a particular location but which is not sound associated with the specific audio 12 (key audio-visual scene). Thus the other sounds 14 may be repeated ambient sound or may be sounds that appear and disappear as the user moves with respect to the virtual space 10.

FIG. 7A illustrates an orientation of the user's point of view 22 relative to a reference direction 60 within the virtual space 10 and FIG. 7B illustrates the change in this orientation that occurs after the transition 50. FIGS. 7A and 7B, are from a perspective of the virtual space 10, and illustrate the reference direction 60 of the virtual space 10 as a fixed direction.

FIGS. 7C and 7D are equivalent to FIGS. 7A and 7B respectively. However, they differ in that these figures illustrate the result of the visual transition 50 from the user's perspective and the user's point of view 22 is a fixed position in these figures.

It will be appreciated from FIGS. 7C and 7D that there is potentially a reorientation of the virtual space 10 relative to the user 20 as a result of the un-muting interrupt 103. The visual transition 50 operates to create a visual break (hiatus) and reduce or prevent disorientation. An example of a visual break is a splash screen, banner or other temporary visual content. Also, the visual transition 50 may be used as a creative edit just like any pre-determined narrative transition. In this case, however, it is at least partly determined by the user action and not only the content creator.

In some example embodiments, it may be that before the un-muting interrupt 103 occurs, the point of view of the user in real space (aligned with the point of view 22 in virtual space 10) may be misaligned with an orientation direction 62 of the user's body in real space, for example, as illustrated in FIG. 7E. This may for example occur if the user has turned their head such that the position of their head is not aligned with the orientation direction 62 of the user's body when the un-muting interrupt 103 occurs. In this situation, after the visual transition 50, the virtual space 10 and in particular the visual content 32 may be centered at the real orientation of the user's head at that time and not with the orientation of the user's body at that time. It would be desirable to be able to recalibrate the virtual space 10 such that the user can change the orientation of their head in real space such that it is properly aligned with their body in real space without causing a rotation of the virtual space. The method 100 may therefore provide a user-selectable soft reset option that temporarily stops user-perspective controlled virtual reality enabling a change in orientation of the user's head without changing a point of view 22 within the virtual space 10. This is illustrated in FIG. 7F. In this figure the point of view 22 of the user has been recalibrated so that it is aligned with the body direction 62 but the virtual space 10 has not been rotated. The reference direction 60 remains fixed in space despite the rotation of the point of view 22.

FIG. 8A illustrates an example in which the method 100 may be used for multiple users. The upper portion of FIG. 8A illustrates the evolution of the method 100 for a first user and the lower portion of FIG. 8A illustrates the evolution of the method 100 for a second user.

Referring to the first user, the first user is initially in the un-muted exploration state 120. The first user then, as a consequence of the muting interrupt 101, enters the muted exploration state 112. Subsequently, as a consequence of the un-muting interrupt 103, the first user experiences 104 the visual transition 50. The first user then experiences 116 the key audio-visual scene. The specific audio 12 and the visual content 32 associated with the specific audio 12 are rendered in the virtual space 10 to the first user through virtual reality. Subsequently the first user, in this example, enters a new un-muted exploration state 120 and the method 100 can repeat with respect to new specific audio 12 associated with a new key audio-visual scene.

In some example embodiments, the method 100 may occur simultaneously and independently in respect of multiple key audio-visual scenes. In this case there may not be a required order to the rendering of the multiple key audio-visual scenes.

In some example embodiments, the method 100 may occur simultaneously and dependently in respect of multiple key audio-visual scenes. In this case there may be a required order to the rendering of the multiple key audio-visual scenes.

The figure (FIG. 8A) illustrates a similar evolution for the second user in respect of the same key audio-visual scene. The first user is initially in the un-muted exploration state 120. The second user then, as a consequence of the muting interrupt 101, enters the muted exploration state 112. Subsequently, as a consequence of the un-muting interrupt 103, the second user experiences 104 the visual transition 50. The second user then experiences 116 the key audio-visual scene—the specific audio 12 and the visual content 32 associated with the specific audio 12 are rendered in the virtual space 10 to the second user through virtual reality. Subsequently the second user, in this example, enters a new un-muted exploration state 120 and the method 100 can repeat with respect to the same new specific audio 12 associated with the same new key audio-visual scene. However, the timings of the different interrupts 101, 103 that cause transitions between the different states vary for the first user and the second user. For example the muting interrupt 101 occurs at a different time and independently for the two users and also the un-muting interrupt 103 may occur independently and at different times for the two users. This may result in the first user and the second user experiencing the key audio-visual scene at different times. It may, in some example embodiments but not necessarily all example embodiments, be desirable to synchronize the experiences of the first and second users at least in part so that they experience the key audio-visual scene simultaneously.

FIG. 8B illustrates how this may be achieved. In some example embodiments, extra time may be added to one of the user's time lines by for example modifying the conditions that cause one or both of the interrupts 101, 103. It is therefore possible in this way to add 80 time to one user and remove time 82 from another user. This corresponds to padding the time line or cutting the time line. These modifications to the conditions may occur dynamically to achieve synchronization at the key audio-visual scene.

FIG. 9 illustrates a narrative 92 that comprises a plurality of narrative way points 90. Each narrative way point 90 corresponds to a different key audio-visual scene that is rendered by the method 100 using block 116. A director may wish to control the order in which these narrative way points 90 occur and also control the timing between the narrative way points 90.

The timing between narrative way points may, for example, be controlled by controlling the conditions that cause the muting interrupt 101 and/or the un-muting interrupt 103. These may, for example, be individually controlled for each narrative way point 90.

It may, in some example embodiments, be desirable where more than one user is experiencing the same narrative to synchronize the multiple users' experience of the narrative such that they simultaneously experience at least some of the same narrative way points 90 at the same time. In the example of FIG. 9, certain ones of the narrative way points 90 are considered to be key narrative way points 91 where it is desirable to achieve synchronization between users. The timing control needed to achieve the synchronization of the key narrative way points 91 may for example be achieved by differentially controlling the conditions for the muting interrupt 101 and/or the un-muting interrupt 103 for different users.

In the context of the narrative, automatically muting the specific audio 12 rendered in the virtual space 10 to a user, through virtual reality pauses rendering of the narrative in the virtual space 10 to the user 20 causing de-synchronization of the narrative and the user. This represents the start of the time period between the narrative way points 90 in FIG. 9. Between the narrative points, the user is able to explore the virtual space 10 through user-perspective controlled virtual reality without hearing the specific audio 12. The user is de-coupled from the narrative 92. The un-muting of the specific audio 12 and the rendering of the specific audio 12 and its associated visual content in the virtual space 10 to the user through virtual reality un-pauses rendering of the narrative in the virtual space 10 to the user forcing re-synchronization of the narrative and the user. This corresponds to having a guarantee that the user returns to the narrative 92 at the narrative way points 90 as a consequence of the method 100.

The method 100, in the context of a narrative 92, therefore comprises: pausing rendering of a narrative 92 in a virtual space 10 to a user 20, through virtual reality, to de-synchronize the narrative 92 and user 20;

enabling the user 20 to explore the virtual space 10 through user-perspective controlled virtual reality, de-coupled from the narrative 92; and subsequently unpausing rendering of the narrative 92 in the virtual space 10 to the user 20, forcing re-synchronization of the narrative 92 and user 20.

During de-synchronization (between narrative waypoints 90) the user 20 and the narrative 92 can diverge, re-synchronization brings the user 20 and the narrative 92 back together, however, between the narrative waypoints 90 the user has freedom to explore the virtual space 10 without being strictly constrained by the narrative 92.

The key audio-visual scene associated with of a narrative waypoint 90 may be experienced from a defined user location 24 in virtual space 10 and/or from a defined user point of view 22 in the virtual space 10 in response to the un-muting interrupt 103, as previously described.

FIG. 10 illustrates an example of an apparatus 200 that may be used for rendering visual content and audio content to a user 20 via virtual reality, and in particular user-perspective controlled virtual reality. The apparatus 200 is a head-mounted apparatus including a head-mounted display 20 and earphones 24. The audio content of the virtual space 10 may be rendered by the earphones 24 and the visual content of the virtual space 10 may be rendered via the head-mounted display 202. The head-mounted apparatus 200 may also comprise sensors 210 that measure movement of the head-mounted apparatus 200 such that the point of view 22 of the user 20 within the virtual space 10 may change with orientation of the user's head. This provides user-perspective controlled virtual reality.

Although in FIG. 10, the apparatus 200 is a head-mounted display that tracks movement of the user's head, in other example embodiments a direction of a user's gaze may be used to change a point of view 22 within the virtual space 10.

FIG. 11 illustrates an example embodiment of a capturing apparatus 300 that may be used to capture a virtual space 10 that may be rendered via audio content and visual content, for example using the apparatus 200. The visual content may be captured via video cameras 310 which may be arranged to capture a very wide field of view perhaps up to 360° via overlapping fields of view of the various video cameras. The images from the video cameras may be stitched together to form a video panorama. In addition the apparatus 300 comprises multiple microphones 312 for capturing the audio content of the virtual space 10.

The method 100 described above, and the various variations to the method, may be performed using a controller 400, as illustrated in FIG. 12, for example.

Implementation of a controller 400 may be as controller circuitry. The controller 400 may be implemented in hardware alone, have certain aspects in software including firmware alone or can be a combination of hardware and software (including firmware).

As illustrated in FIG. 11 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 200, 300 when loaded into the processor 402. The computer program instructions, of the computer program 406, provide the logic and routines that enables the apparatus to perform the methods illustrated in FIG. 2. The processor 402 by reading the memory 404 is able to load and execute the computer program 406.

The apparatus 200, 300 therefore comprises:

at least one processor 402; and at least one memory 404 including computer program code the at least one memory 404 and the computer program code configured to, with the at least one processor 402, cause the apparatus 200, 300 at least to perform:

causing automatic preventing rendering of specific audio for rendering in a virtual space to a user, through virtual reality;

enabling the user to explore the virtual space through user-perspective controlled virtual reality without hearing the specific audio; and in response to an interrupt, causing performing a visual transition to audio-visual content comprising the specific audio and visual content associated with the specific audio and then causing rendering of the specific audio and the visual content associated with the specific audio in the virtual space to the user through virtual reality.

The controller 400 may for example be programmed by an operator, for example via a user interface, to perform one of more of: define the specific audio 12 or control the content of the specific audio 12, control what visual content is associated with the specific audio 12, control the conditions for the muting interrupt 101, control how the muting occurs, control the conditions for the un-muting interrupt 103, control how the un-muting occurs and control the visual transition 50 of block 104. In this way, the controller 400 may, for example, be used by a director to control the pacing of a narrative 92 and how it is rendered to a user. Such a controller may form part of the capturing apparatus 300 or part of a system comprising the capturing apparatus 300.

The parameters that define the various programmable options may be transmitted with the data defining the audio content and/or visual content for the virtual space 10.

In other example embodiments, the controller 400 may be used for rendering, for example via the rendering apparatus 200. In this example, the user may be able to control some or more of: the conditions for the muting interrupt 101, the conditions for the un-muting interrupt 103 and the content of the visual transition 50.

As illustrated in FIG. 13, the computer program 406 may arrive at the apparatus 200, 300 via any suitable delivery mechanism 410. The delivery mechanism 410 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 406. The delivery mechanism may be a signal configured to reliably transfer the computer program 406. The apparatus 200, 300 may propagate or transmit the computer program 406 as a computer data signal.

Although the memory 404 is illustrated as a single component/circuitry it may be implemented as one or more separate components/circuitry some or all of which may be integrated/removable and/or may provide permanent/semi-permanent/ dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 2 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

FIGS. 14A-H illustrate a top-view of the virtual space 10 over time, similar to FIGS. 5A-5C. A point of view 22 of a user defines visual content 32 within the virtual space 10 that is rendered to a user through user-perspective controlled virtual reality. The visual content 32 is determined by a field of view centered on the point of view 22. The visual content 32 changes as a consequence of a narrative or as a consequence of a user changing their point of view. A key scene is illustrated in FIG. 14E-14G which involves specific audio 12.

FIGS. 15A-H illustrate for each of FIGS. 14A-H, the corresponding visual content 32 rendered to the user according to the point of view 22A in FIGS. 14A-H. A key scene is illustrated in FIG. 15E-15G that involves specific audio 12. In this example, the user 20 closely follows the intended narrative and the user's point of view 22 tracks the key scene/action.

FIGS. 16A-G illustrate for each of FIGS. 14A-G, the corresponding visual content 32 rendered to the user 20 according to the point of view 22B in FIGS. 14A-G. The key scene is not illustrated in FIG. 16E-16G because the user is looking the wrong way. When the user looks away from the key scene (e.g. FIG. 16D) (fulfilling the muting interrupt criteria in this example), the muting interrupt 101 occurs and the specific audio 12 is muted. This prevents the user 20 hearing the specific audio 12 associated with a key audiovisual scene without seeing the visual content associated with that specific audio 12. In this example, after a time out, the un-muting interrupt occurs which causes transition 50. In this example the transition 50 provides no visual content corresponding to FIG. 14H, but it may, for example, occur earlier or later in the user time. The transition 50 causes the key audio visual scene to be rendered to the user including the specific audio 12 and the visual content 32 associated with that visual content 32. For example the audio-visual content from the scenes corresponding to FIGS. 15A-15H or 15E-15H may be rendered to the user after the transition 50.

Referring to FIGS. 15A-H, as a first scene opens, an actor wearing light-colored clothing is standing at a dumpster (FIG. 15A). It is day time. A moment later, a second actor (wearing darker-colored clothing) appears on the scene (FIG. 15B). The two actors begin to have a conversation (FIG. 15C). The conversation takes some time (FIG. 15D), but finally they start walking towards a car all the while continuing the conversation (FIG. 15E-15F). As they are passing the car by, the first actor pulls a gun on the second actor and shoots him from behind (FIG. 15G). Immediately after the gun shot the first scene ends and transition takes us to the next scene (FIG. 15H). It is night time. The actor who was shot appears to be in the dumpster, while the first actor is leaving the scene in the direction from where the second actor originally appeared. A bird has appeared on the dumpster and is looking into it.

Referring to FIGS. 16A-G, as the first scene opens, the user point of view has been set to what the director wishes the user to look at (FIG. 16A). The user first looks at the first actor and starts to view details around the first actor, but then sees the second actor entering the scene (FIG. 16B). The user concentrates on the conversation (FIG. 16C), but decides this is not visually too interesting and soon starts to change his point of view and view more of the virtual space (FIGS. 16D-16G). While the two actors begin to walk, the user has turned his view significantly and is finding something particularly interesting (FIG. 16E). There appears to be an old poster on the wall. If the user had continued to hear the specific audio 12, he would have heard the gun shot from his back right and he could have reacted to it, there would be an immediate scene transition to the next scene where the first actor is leaving the scene, and there seems to be another person in the dumpster with a bird looking at the dead body—the user just missed the murder looking the wrong way at the wrong time.

According to the method 100, the specific audio 12, corresponding to an action that is not in view at an action-specific decision instance, is muted in response to the muting interrupt 101 to maintain its surprise effect for the time the corresponding visual content is viewed. When we utilize the method 100, the user looks at the poster without knowing that something is happening behind him. The key audio 12 that would tip him off has been removed from the rendering. A new transition 50 then takes the user back in time to a view he did not experience before.

This solution allows the user the freedom to explore the virtual space without missing the key action or experiencing any spoilers due to spatial audio rendering associated with an unseen action.

The transition 50 that takes the user to the action instance is performed in response to the un-muting interrupt 103.

The transition 50 taking the user from the user's current view to the action instance of the central action should preferably appear to be intentional and at least well implemented in a way not to distract the user. Depending on the content it may be defined, e.g., to use a cut, a dissolve, or a quick flash pan. A preferred transition selected for each scene, central action, or action instance of a central action by the content creator may be signaled to the renderer. Automatic analysis combining the content and user action (e.g., is the transition triggered by grace period or by head turn) may also select the transition type. For example, the direction of user turn and the distance to turn may affect whether a flash pan is used and the direction where the flash pan goes. This part may be implemented in the renderer.

In this example, the un-muting interrupt 103 occurs in response to the user turning outside a safe region or when a grace period runs out, whichever happens first.

A safe region for a current user's point of view is defined based on the scene information within which the user is free to continue his exploration.

A safe region refers to the area within which the user is not seeing the at least one central action, the key scene, or some other secondary content of interest. In some embodiments, the safe region may be defined, e.g., as sectors that may feature a safety margin on the border. In other embodiments, the safe region may be simply the inverse of the combination of all the scene's central actions and secondary areas of interest.

It is also noted that there may be more than one safe region per scene. The number of safe regions may change over time.

The shape and size of a safe region may change over time.

In some advanced implementations where a scene has more than one safe region, they may be treated differently. For example, a first safe region may be strictly enforced, whereas a momentary breach of a second safe region may be permitted.

In some embodiments, the safe region may thus have a "gradual penalty" on its border where breaching time is considered. Only when a threshold is met, an interrupt is produced.

FIG. 17 illustrates an example of a trigger for an interrupt in the context of FIGS. 14-16.

The figure illustrates the same virtual space 10 as illustrated in FIGS. 14A-14H.

The figure illustrates using hatching a first range 31 of points of view 22 (safe region). If the user 20 has a point of view 22 within this range the user cannot adequately view the key scenes illustrated in FIGS. 15E-15G.

The first range of points of view 22 (safe region) defines one or more user-dependent interrupt conditions for generating an interrupt.

For example, it may define a user-dependent muting condition 28 dependent upon the location 24 and/or field of view 22 of the user 20 that triggers the muting interrupt 101.

For example, it may define a user-dependent un-muting condition 29 dependent upon the location 24 and/or field of view 22 of the user 20 that triggers the un-muting interrupt 103.

The muting interrupt 101 may be caused when the user point of view 22 is outside the first range at the time of the key scenes or a time approaching the key scenes.

The un-muting interrupt 103 may be caused when the user point of view 22 is inside the first range at the time of the key scenes or a time approaching the key scenes or after a timeout, for example.

Thus the muting interrupt 101 is an automatic response to the user performing an action (e.g. turning in the wrong direction) that prevents the user seeing a source of the specific audio when a key event occurs. The muting interrupt 101 is an automatic response to the user turning in the wrong direction (i.e., too far) relative to a time instance of the audio-visual content and the key scene. The un-muting interrupt 103 happens when too much time has then elapsed or when the user is turning towards the direction of the key scene.

According to the method 100, the key audio 12 is muted and un-muted. The current user view direction is compared against the direction of the at least one central action (key scene). If they match, playback is continued. If they do not match, an analysis is performed concerning the action-specific decision instance and the safe region. This processing may take into account implementation-specific criteria such as user head movement direction and speed and, e.g., a state machine to evaluate the action-specific decision instance (if said instance is a time window) for improved decision accuracy. If the time instant meets the action-specific decision instance criteria and the user viewing direction corresponds to a safe region, the system produces the muting interrupt 101. Otherwise, playback continues normally.

The next analysis determines whether the user point of view direction remains in the safe region and there is still time left in the grace period. As long as this holds, the playback continues with muted key audio 12. When it no longer holds, the un-muting interrupt 103 is produced, forcing the transition 50 and rendering of the key audio-visual scene including the key audio 12 and the key visual scene associated with the key audio 12. The playback continues.

The grace period is the time for the user to view content in the wrong direction. In a multi-user consumption, one user (user A) may generally like to explore more than a second user (user B) who is happy to mostly concentrate on the central action (key scene) only. In general, this suggests that user A will take a longer time to consume a certain content. It may however be desirable that the users reach the end of the content at more or less the same time. It may additionally be desirable that the users experience a certain peak moment during the content at more or less the same time. Therefore, the grace period of a first user may be relaxed or shortened based on the delay between the first user and at least a second user. This adaptation of the grace period may be carried out in the multi-user rendering system.

Where a structural feature has been described, it may be replaced by means for performing one or more of the functions of the structural feature whether that function or those functions are explicitly or implicitly described.

The controller 400 may be a module. As used here 'module' refers to a unit or apparatus that excludes certain parts/components that would be added by an end manufacturer or a user.

The term 'and/or' is used in this document with an inclusive not exclusive meaning.

That is any reference to X and/or Y encompasses one or more of: X never Y; X not Y; Y never X; Y not X; optionally X or Y; both X and Y. Thus changing a point of view and/or a location, encompasses as one example (i) changing a point of view only without changing location, encompasses as another example (ii) changing a point of view only without having the ability to change location and encompasses as a further example (iii) changing a point of view and changing location.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    at least one processor; and
    at least one memory comprising computer program code, the at least one memory and the computer program code configured to, with the at least one processor, cause the apparatus to perform at least the following:
    automatically pausing rendering of a sub-set of audio in a virtual space through virtual reality, wherein pausing rendering of the sub-set of audio in the virtual space does not prevent rendering of other audio in the virtual space through user-perspective controlled virtual reality;
    enabling user exploration of the virtual space through user-perspective controlled virtual reality without hearing the sub-set of audio; and
    performing, in response to an interrupt, a forced transition to audio-visual content comprising the sub-set of audio and visual content associated with the sub-set of audio and unpausing the rendering of the sub-set of audio, and rendering the audio-visual content comprising the sub-set of audio and the visual content associated with the sub-set of audio in the virtual space to the user through virtual reality.

2. The apparatus of claim 1, wherein the at least one memory and the computer program code are further configured to, with the at least one processor, cause the apparatus to:
    cause provision of a user-selectable reset option that temporarily suspends user-perspective controlled virtual reality enabling a change in orientation of a user's head without changing a point of view within the virtual space.

3. The apparatus of claim 1, wherein visual content rendered before the forced transition and while the rendering of the sub-set of audio is paused is dependent upon at least a user-determined point of view, and the audio-visual content associated with the sub-set of audio rendered after the forced transition is not user-determined.

4. The apparatus of claim 1, wherein performing the forced transition comprises:
    forcing an apparent user location in the virtual space to coincide with a user location associated with the sub-set of audio, or
    forcing an apparent user point of view within the virtual space to coincide with a user point of view associated with the sub-set of audio, and
    wherein the rendering of the visual content based on at least one of the location or the point of view of the user is synchronized with the rendering of the sub-set of audio.

5. The apparatus of claim 1, wherein rendering the audio-visual content comprising the sub-set of audio and the visual content associated with the sub-set of audio in the virtual space further comprises:
    teleport within the virtual space- a user location in the virtual space to a different location associated with the sub-set of audio and/or a user point of view in the virtual space to a point of view associated with the sub-set of audio; or
    render the visual content associated with the sub-set of audio through a frame without changing the user location and/or user point of view within the visual space.

6. The apparatus of claim 1, wherein the interrupt is generated based upon at least one of a user location relative to a key scene associated with the sub-set of audio within the virtual space, a user viewing direction relative to the key scene, or time elapsed within the virtual space while the rendering is paused.

7. The apparatus of claim 1, wherein the interrupt is generated based upon at least one of satisfaction of one or more conditions determined by a user interaction with the virtual space.

8. The apparatus of claim 1 further caused to:
    pausing rendering of the sub-set of audio by switching a sound object, for the sub-set of audio, from a first un-muted state to a second muted state in response to a user-controlled change of location of the user within the virtual space, or a user-controlled change of user point of view within the virtual space that results in preclusion of rendering a key scene associated with the sub-set of audio; and
    in response to the interrupt, un-mute the sub-set of audio and render the sub-set of audio in the virtual space to the user through virtual reality by forcing switching of the sound object from the second muted state to the first un-muted state in dependence upon the interrupt,
    wherein the sound object is associated with visual content of the key scene.

9. The apparatus of claim 1, wherein the at least one memory and the computer program code are further configured to, with the at least one processor, cause the apparatus to enable, via a user interface, control of one or more of:
    content of the sub-set of audio, identification of the sub-set of audio, conditions for preventing rendering of the sub-set of audio, effects relating to the pausing of the rendering of the sub-set of audio, conditions for rendering the audio-visual content comprising the sub-set of audio, effects relating to the rendering of the audio-visual content comprising the sub-set of audio, or effects relating to the forced transition.

10. The apparatus of claim 1, wherein pausing the rendering of the sub-set of audio comprises pausing rendering of a narrative and de-synchronization of the narrative and the rendering of the visual content based on at least one of a location or point of view of the user, and wherein the interrupt further causes re-synchronization of the narrative and the rendering of the visual content based on at least one of a location or point of view of the user.

11. A method comprising:
automatically pausing rendering of a sub-set of audio in a virtual space to a user through virtual reality, wherein pausing rendering of the sub-set of audio in the virtual space does not prevent rendering of other audio in the virtual space through user-perspective controlled virtual reality;
enabling user exploration of the virtual space through user-perspective controlled virtual reality without hearing the sub-set of audio; and
in response to an interrupt, performing a forced transition to audio-visual content comprising the sub-set of audio and visual content associated with the sub-set of audio and unpausing the rendering of the sub-set of audio, and rendering the audio-visual content comprising the sub-set of audio and the visual content associated with the sub-set of audio in the virtual space through virtual reality.

12. A method as claimed in claim 11, comprising providing a user-selectable reset option that temporarily suspends user-perspective controlled virtual reality enabling a change in orientation of a user's head without changing a point of view within the virtual space.

13. A method as claimed in claim 11, wherein visual content rendered before the forced transition and while the rendering of the sub-set of audio is paused is dependent upon at least a user-determined point of view and the audio-visual content associated with the sub-set of audio rendered after the forced transition is not user-determined.

14. A method as claimed in claim 11, further comprising:
forcing an apparent user location in the virtual space to coincide with a user location associated with the sub-set of audio, or
forcing an apparent user point of view within the virtual space to coincide with a user point of view associated with the sub-set of audio, and
wherein the rendering of the visual content based on at least one of the location or the point of view of the user is synchronized with the rendering of the sub-set of audio.

15. A method as claimed in claim 11, wherein rendering the audio-visual content comprising the sub-set of audio and the visual content associated with the sub-set of audio in the virtual space further comprises:
teleporting within the virtual space- a user location in the virtual space to a different location associated with the sub-set of audio and/or a user point of view in the virtual space to a point of view associated with the sub-set of audio; or rendering the visual content associated with the sub-set of audio through a frame without changing the user location and/or user point of view within the visual space.

16. A method as claimed in claim 11, wherein the interrupt is generated based upon at least one of a user location relative to a key scene associated with the sub-set of audio within the virtual space, a user viewing direction relative to the key scene, or time elapsed within the virtual space while the rendering is paused.

17. A method as claimed in claim 11, wherein the interrupt is generated based upon at least one of satisfaction of one or more conditions, determined by a user interaction with the virtual space.

18. A method as claimed in claim 11, comprising:
pausing rendering of the sub-set of audio by switching a sound object, for the sub-set of audio, from a first un-muted state to a second muted state in response to a user-controlled change of location of the user within the virtual space or a user-controlled change of user point of view within the virtual space that results in preclusion of rendering a key scene associated with the sub-set of audio; and
in response to the interrupt, un-muting the sub-set of audio and rendering the sub-set of audio in the virtual space to the user through virtual reality by forcing switching of the sound object from the second muted state to the first un-muted state in dependence upon the interrupt,
wherein the sound object is associated with visual content of the key scene.

19. A non-transitory computer readable medium comprising program instructions stored thereon for performing at least the following:
automatically pausing rendering of a sub-set of audio in a virtual space to a user through virtual reality, wherein pausing rendering of the sub-set of audio in the virtual space does not prevent rendering of other audio in the virtual space through user-perspective controlled virtual reality;
enabling the user to explore user exploration of the virtual space through user-perspective controlled virtual reality without hearing the sub-set of audio; and
performing, in response to an interrupt, a forced transition to audio-visual content comprising the sub-set of audio and visual content associated with the sub-set of audio and unpausing the rendering of the sub-set of audio, and rendering the audio-visual content comprising the sub-set of audio and the visual content associated with the sub-set of audio in the virtual space through virtual reality.

20. The apparatus of claim 1, wherein pausing rendering of the sub-set of audio does not mute ambient sound that is independent of at least one of user location or point of view of the user within the virtual space, and does not mute selective sound that is particular to a location or point of view of the user within the virtual space not associated with the sub-set of audio.

* * * * *

UNITED STATES PATENT AND TRADEMARK OFFICE
CERTIFICATE OF CORRECTION

PATENT NO. : 11,094,119 B2
APPLICATION NO. : 16/487070
DATED : August 17, 2021
INVENTOR(S) : Laaksonen et al.

Page 1 of 1

It is certified that error appears in the above-identified patent and that said Letters Patent is hereby corrected as shown below:

In the Claims

Column 25,
Line 57, "in the virtual space to the user" should read --in the virtual space--.

Column 28,
Line 40, "enabling the user to explore user exploration" should read --enabling user exploration--.

Signed and Sealed this
Nineteenth Day of July, 2022

Katherine Kelly Vidal
*Director of the United States Patent and Trademark Office*